United States Patent [19]

Sugita et al.

[11] 4,453,823

[45] Jun. 12, 1984

[54] METHOD OF STOPPING A FILM

[75] Inventors: Yasutoshi Sugita, Ichikawa; Yoshio Ando, Chigasaki, both of Japan

[73] Assignee: Canon Kabushiki Kaisha, Tokyo, Japan

[21] Appl. No.: 374,056

[22] Filed: May 3, 1982

[30] Foreign Application Priority Data

May 25, 1981 [JP] Japan ................................. 56-79022
May 25, 1981 [JP] Japan ............................. 56-75622[U]

[51] Int. Cl.³ ...................... G03B 27/52; G03B 25/32; G03B 23/12
[52] U.S. Cl. ......................................... 355/50; 226/33; 250/570; 353/26 A; 355/64
[58] Field of Search ................ 353/26 A, 27 A, 26 R, 353/121; 355/41, 50, 64; 352/169, 92, 236; 250/570; 226/33, 45

[56] References Cited

U.S. PATENT DOCUMENTS

| | | | |
|---|---|---|---|
| 3,148,585 | 9/1964 | Armstrong et al. | 226/45 X |
| 3,867,030 | 2/1975 | Tanaka | 355/41 |
| 3,870,410 | 3/1975 | Abe | 250/561 X |
| 3,874,791 | 4/1975 | Thieme et al. | 353/26 A X |
| 3,907,415 | 9/1975 | Sone et al. | 353/26 |
| 4,028,552 | 6/1977 | Volk, jr. | 250/570 |
| 4,174,174 | 11/1979 | Hunter | 355/64 |
| 4,384,786 | 5/1983 | Kuroda | 355/64 |

FOREIGN PATENT DOCUMENTS 39-51824 4/1954 Japan.
4740492 11/1967 Japan .............................. 353/26 A Primary Examiner—Steven L. Stephan
Attorney, Agent, or Firm—Fitzpatrick, Cella, Harper & Scinto

[57] ABSTRACT

The present invention relates to a method of stopping a film containing a plural number of frames having images recorded thereon. First and second detectors each having at least one photo-electric transducer element are arranged along the feed path of the film. The first and second detectors are disposed in such a manner that when the first detector receives the light from the frame, the second detector receives the light from the blank portion (non-image portion) between frames. A signal is produced only when the first detector detects a desired frame and the second detector detects the blank portion at the same time during the feeding of the film. After the generation of the signal, the film is further advanced in a determined direction by a determined length of the film and then the film feeding is stopped to stop the desired frame in the film at a determined position.

5 Claims, 12 Drawing Figures

METHOD OF STOPPING A FILM

BACKGROUND OF THE INVENTION

1. Field of the Invention

The present invention relates to a method of stopping a desired frame selected among a plural number of frames of a film containing images recorded thereon at a predetermined position.

2. Description of the Prior Art

In a microfilm, a number of images are recorded on the frames of the film respectively. To retrieve an image or images desired in the microfilm there has been, conventionally, used frame marks. The frame marks have been provided on the side edge part of the film one mark for one frame. In feeding the microfilm the frame marks are counted serially and the content of the counter is continuously compared with the frame number of the frame to be retrieved. When the coincidence of count and frame number takes place, the microfilm is stopped at once.

However, there are other kinds of microfilm having no frame marks. In this case, the retrieving method described above can not be used. For such a film having no frame marks, the retrieving of a desired image has been, conventionally, attained by detecting the blank portion (non-image portion) between frames by a sensor. However, this method also has a problem. The interval between adjacent blank portions is not always regular but varies from film to film. Therefore, the film may be stopped in different positions according to the direction film feed. It may be stopped not in the desired position but a deviated position from the desired position. Such deviation of film stop position causes a problem in particular for a reader or a reader-printer by which the recorded image in the microfilm is projected on a screen or on a photosensitive medium with a selected magnification. If there is any deviation of the stop position, the desired image can not correctly be projected on the screen or the image can not completely and correctly be printed on the copy paper. To position the image of the desired frame at the right position, the operator has to additionally adjust the stop position, which may cause a problem for the operator.

SUMMARY OF THE INVENTION

Accordingly, it is an object of the invention to enable any desired frame of a film to be stopped at the determined position.

It is another object of the invention to always stop the desired frame correctly at the desired position irrespective of the direction of film feed.

It is a further object of the invention to enable the film to be stopped at a proper position in which the desired image can completely be projected on a selected projection plane.

It is a still further object of the invention to prevent the projected image from being partly cut off by the frame sensor in which case a part of the image is no longer projected on the projection plane.

Other and further objects, features and advantages of the invention will appear more fully from the following description of preferred embodiments taken in connection with the accompanying drawings.

DETAILED DESCRIPTION OF THE PREFERRED EMBODIMENTS

Figure 1:
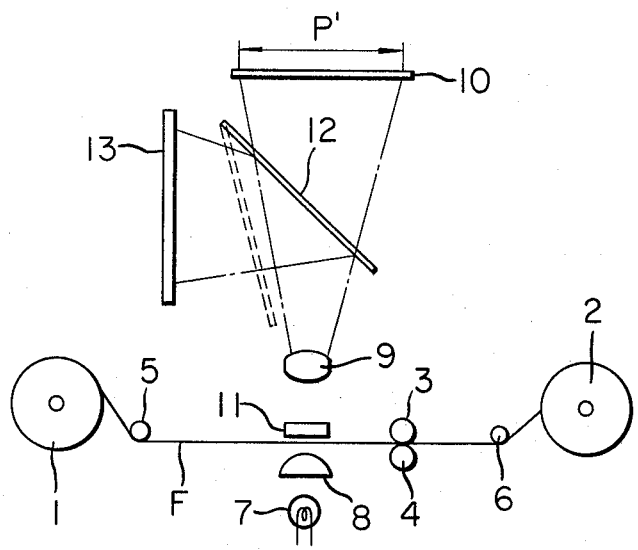
FIG. 1 schematically shows the arrangement of a reader-printer to which the present invention is applied.

Referring first to FIG. 1 showing an arrangement of reader-printer, F is a microfilm. Reference numerals 1 and 2 depict take-up reels for taking up the microfilm F in the form of a roll around the reel. Numeral 3 designates is a film feeding capstan roller and 4 is a pinch roller. The capstan roller is connected with a reversible motor and is rotated by the motor. According to the rotational direction of the motor, the film F is moved from reel 1 to reel 2 or from reel 2 or reel 1 by the capstan roller. Reference numerals 5 and 6 depict film guide rollers, 7 is an illumination lamp and 8 is a condenser lens.

A frame of image in the microfilm F is illuminated by the lamp 7 and is projected on a screen 13 or on a photosensitive medium 10 through a magnifying projection lens 9. Between the projection lens 9 and the photosensitive medium 10 there is disposed a mirror 12. The mirror 12 is pivotally movable between the position in the optical path of the lens 9 and the retracted position from the optical path. When the mirror 12 is in the optical path of the lens 9 indicated by the solid line, the selected frame of image of the film F is projected on the screen 13 through the lens 9. When it is out of the optical path as indicated by the phantom lines, the image is projected on the photosensitive medium 10. Designated by 11 is a detector for detecting an image frame and a subject index on the microfilm F.

Figure 2:
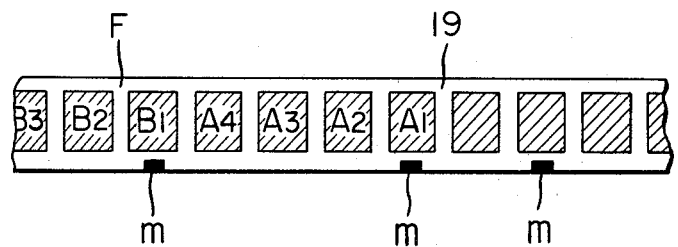
FIG. 2 is a plan view of a microfilm.

As shown in FIG. 2, the microfilm F includes many frames having images recorded thereon, respectively. For the purpose of explanation, a group of frames containing a series of related images on one subject are indicated by $A_1$ to $A_4$ and another group of frames containing a series of related images on another subject are indicated by $B_1$ to $B_n$ in FIG. 2. A subject index m is marked at one side of the first frame of the first frame group $A_1$–$A_4$. Similarly, a subject index m is marked at one side of the first frame of the second frame group $B_1$–$B_n$. Numeral 19 designates a blank portion between image frames. The blank portion 19 has no image recorded thereon and remains blank. The subject index m is marked in different density from the side marginal part of the film. The sequence of frames in the first group $A_1$ to $A_4$ and also in the second frame group $B_1$ to $B_n$ is, in the shown example, in an order of the pages recorded on the film frames. The microfilm shown in FIG. 2 is a negative film. Therefore, every blank portion 19 is transparent and the background of every image portion is opaque. However, it is to be noted that the present invention is applicable also to positive film. In this case, the blank portion is opaque and the background of image portion is transparent.

Figure 3:
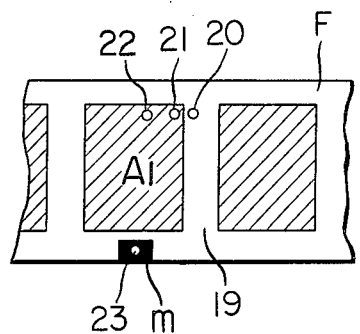
FIG. 3 is a view showing the positional relation between sensor and microfilm.

The detector 11 comprises a frame detector and a subject index detector. As shown in FIG. 3, the frame detector is constituted of three sensors (photo-electric transducer elements) 20, 21 and 22. The subject index detector is composed of at least one sensor 23 (photoelectric transducer element 23). These sensors are arranged along the feed path of the microfilm F and opposed to the lamp 7 with the microfilm being interposed between the sensor and the lamp. As the microfilm F is moved along the film feed path, the light toward the sensors from the lamp is intermittently cut off by the image portions of the film. At this time point, a signal is issued from the corresponding sensor. If it is desirable, these sensors may be arranged in such a manner as to receive the light signal from the microfilm through a suitable light guiding member such as optical fiber bundle.

The positional relation of sensors 20, 21 and 22 in the frame detector is so determined that when the sensor 20 receives the light signal from the blank portion 19, the remaining two sensors 21 and 22 can receive the light signal from the image frame. The distance between sensors 20 and 21 is smaller than the distance between sensors 21 and 22 measured in the direction of the film being moved. The function of sensor 22 is to prevent any wrong signal from being generated from the frame detector by dust or other foreign particles deposited on the film. In the position shown in FIG. 3, the sensor 20 is in the blank portion 19 and the sensor 21 is in the image frame $A_1$. The sensor 22 has to be positioned in such a manner that when the sensors 20 and 21 are in the shown position relative to the frame $A_1$, the sensor 22 receives the light signal from the image portion of the frame $A_1$. Generally speaking, the upper side area of every frame is mere background of the recorded image and usually contains no essential portion of the image recorded in the frame. Therefore, the sensors 21 and 22 should be located near the side area within the frame so as not to receive any light signal from the transparent portions within the frame. The frame detector may be composed of only two sensors 20 and 21 while omitting the sensor 22.

The sensor 23 of the subject index detector is located in the position for receiving the light signal from the subject index m. When the light from the lamp 7 is cut off by the subject index m, the sensor 23 generates a subject index signal. A counter counts the subject index signal. As soon as the content of the counter and the subject number of the desired image have got in coincidence, the microfilm is stopped. Thus, the operator can retrieve the desired image.

Figure 4:
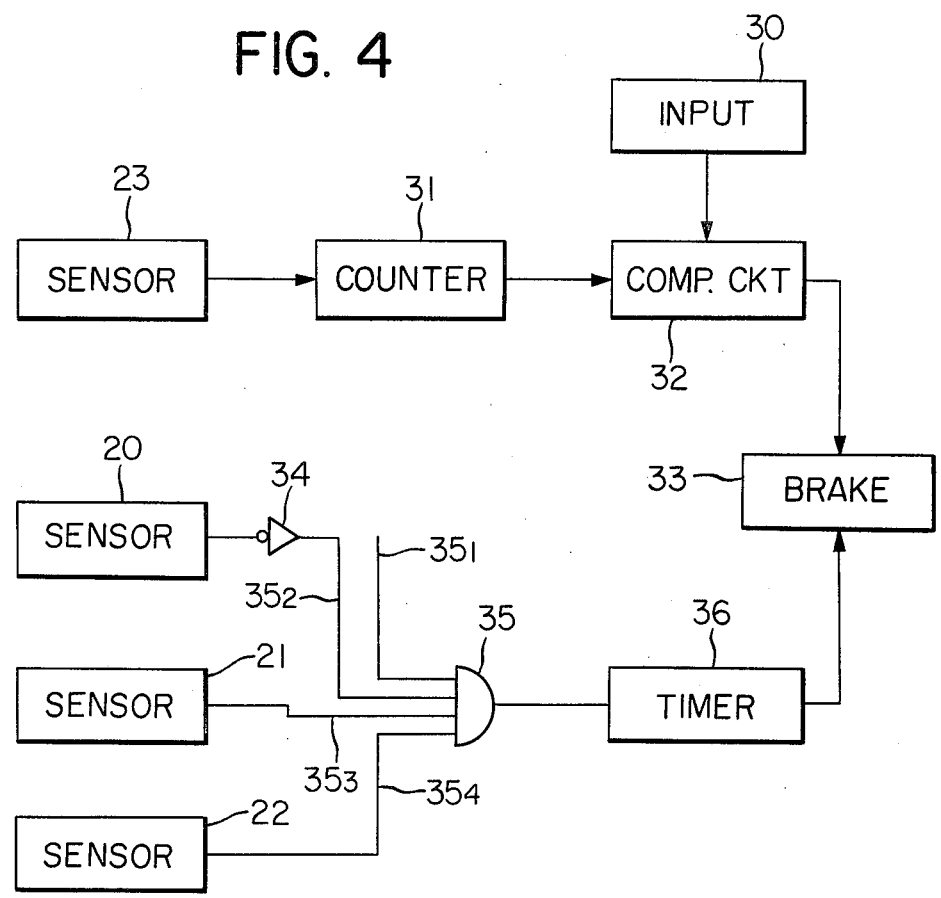
FIG. 4 is a block diagram of an embodiment of the retrieving apparatus according to the invention.

The details of apparatus for retrieving any desired image by use of subject index are known, for example, from U.S. Pat. No. 3,907,415. FIG. 4 shows an arrangement of the retrieving apparatus.

In FIG. 4, the reference numeral 30 depicts an input device for input of the subject number of a desired image to be retrieved and keeping the input subject number in memory. A counter 31 is for counting the subject index signals generated from the sensor 23. According to the direction of film feed, the signals are counted up or counted down. A comparator circuit makes a comparison between the subject number introduced in the input device 30 and the content of the counter 31. When the subject number and the counter content get in coincidence, the comparator circuit produces a high level signal as a stop signal. A brake 33 is operable in response to the stop signal. When the brake 33 is actuated by a stop signal from the comparator 32, the capstan roller 3 is inhibited from rotating and the motor for driving the capstan roller 3 is stopped thereby stopping the microfilm.

Numeral 34 depicts an inverter and 35 is an AND gate. A high level control signal is applied to one input terminal $35_1$ of the AND gate 35. The sensor 20 puts out a low level signal only when the light transmitted through the blank portion 19 of the microfilm enters the sensor 20. When the light incident on the sensors 21, 22 is cut off by the image frame, high level signals are produced from the sensors 21 and 22 respectively. The low level signal from the sensor 20 is inverted by the inverter 34 and then applied to the input terminal $35_2$ of AND gate 35. High level signals from the sensors 21 and 22 are applied to other input terminals $35_3$ and $35_4$ of AND gate 35. Therefore, when the input terminals $35_2$, $35_3$, $35_4$ are all at high level, it means the detection of frame by the frame detector. In this state of inputs to AND gate 35, the latter is opened by application of a high level control signal to the input terminal $35_1$. Thus a frame detection signal is output from AND gate 35. In response to the frame detection signal, a timer 36 is actuated and a stop signal is generated from the timer after a certain preset time period. This stop signal actuates the brake 33 to stop the microfilm. The timer time preset at the timer 36 is determined corresponding to the film feeding speed (which should be constant).

FIGS. 5A through E illustrate the manner of making a copy by a printer. To this end, the frame group of the desired subject is retrieved by means of the subject index and then every frame in the retrieved subject group is detected by means of the output signal from the above described frame detector to print out the images on the desired subject frame by frame.

In FIG. 5, reference P indicates an area where copy making is possible. The area P is coincident with the optical path of the projection lens 9. Only the image of the microfilm lying within the area P can be projected on the photosensitive medium 10 or on the screen 13. The frame detector is located outside of the area P and therefore it is never projected on the photosensitive medium or on the screen. The lamp 7 is so disposed as to illuminate not only the area P but also the detector 11.

Figure 5A:
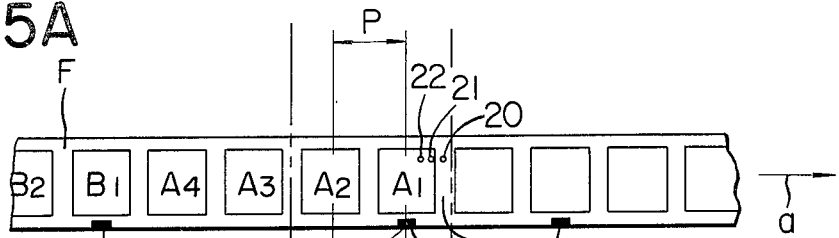
FIGS. 5A–5E show the microfilm in different positions during film feeding.

FIG. 5A shows the microfilm F in the position where the first frame $A_1$ of a frame group relating to the desired subject has been retrieved and the microfilm is at rest. In this position, the sensors 21 and 22 are within the frame $A_1$ and the sensor 20 is in the blank portion 19 as shown in FIG. 5A. The sensor 23 is just within the subject index m. A portion of the frame $A_1$ and a portion of the next frame $A_2$ lying within the area P are projected on the photosensitive member 10 or on the screen 13.

Figure 5B:
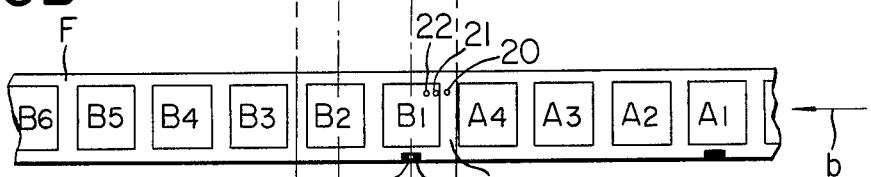
Figure 5C:
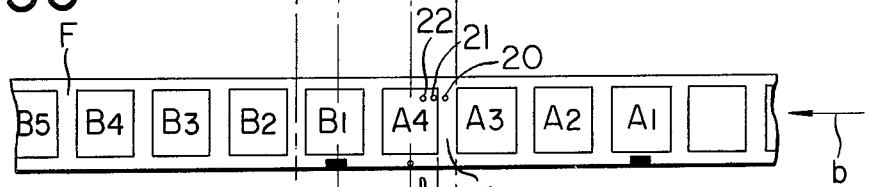
Figure 5D:
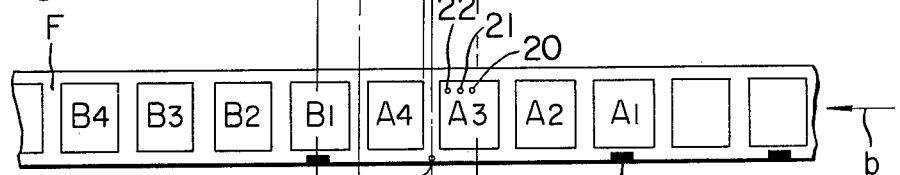

In the position shown in FIG. 5A, the operator can depress a copy button of the input device 30 to give a command to start a copy. When the copy start command is issued, the film F is moved in the direction of arrow a. After all of the related frames $A_1$ to $A_4$ of the desired subject have passed over the area P, the subject index m of the first frame $B_1$ of the next frame group $B_1$ to $B_n$ is detected by the sensor 23. At this time point, a stop signal is output from the comparator circuit 32 in the manner described above. Thus, the microfilm F is stopped. FIG. 5B shows this state of the microfilm. After detecting the subject index m belonging to the frame $B_1$, the microfilm F is moved in the reversed direction, namely in the direction of arrow b. With this film feed in the direction of arrow b, the retrieving apparatus generates the above mentioned high level control signal. The control signal is continuously generated until the copying of all the related images of the desired subject has been finished. In the course of film feed in the direction b, a frame detection signal is produced from AND gate 35 when the sensor 20 receives the light signal from the blank portion 19 and the sensors 21 and 22 receive the light signal from the image portion at the same time in the manner described above. By this frame detection signal the timer 36 is actuated. This position of the microfilm F is shown in FIG. 5C. In this position, the frame detector composed of sensors 20, 21, 22 detects the frame $A_4$ and actuates the timer 36. The microfilm F is further moved in the direction b by predetermined distance l after detecting the frame $A_4$. The timer 36 generates a stop signal when the microfilm has been moved further by the distance l. By this stop signal the brake 33 is actuated to stop the microfilm in the position shown in FIG. 5D. In this position, the frame $A_4$ is in the determined position, that is, within the copy area P where the entire image of the frame $A_4$ is correctly projected on the photosensitive member 10 and a copy of the image is automatically made. The copy thus obtained is discharged into a tray of the reader-printer with its image side upward.

Figure 5E:
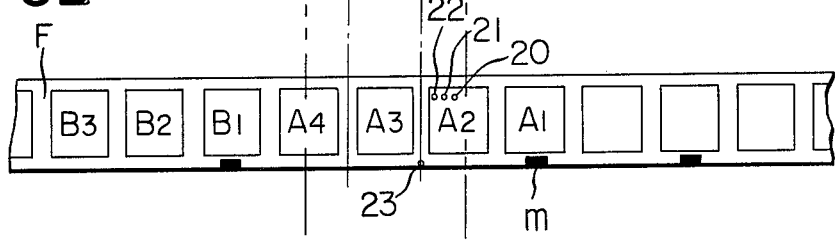

After completing the copy making of frame $A_4$, the microfilm F again starts moving in the direction of arrow b. The frame detector detects the frame $A_3$ and a frame detection signal is produced from AND gate 35. The timer 36 is actuated by the detection signal. When the microfilm F is further moved by the predetermined distance l after the actuation of the timer, the latter generates a stop signal to stop the microfilm. FIG. 5E shows this position of the microfilm. Now, the frame $A_3$ is within the copy area P. Similarly to the above frame $A_4$, a copy of the image of frame $A_3$ is produced.

The above procedure for making a copy is repeated up to the frame $A_1$. In this manner, a series of related images of the desired subject are copied in series. When the copying operations of all of the frames $A_1$ to $A_4$ on the desired subject is completed, a set of desired copies are obtained and stacked in the tray in the order of their pages.

In the above copy making process, a frame is further moved up to the predetermined copy position after detecting the frame. Since the copy position, that is, the area P, is distant from the frame detector, there is no problem that a part of the image light incident on the photosensitive medium may be cut out by the detector resulting in a copy in which a portion of the image is missing.

In the above embodiment, the frame detection signal from the frame detector has been used to retrieve images frame by frame. However, it is also possible to retrieve a desired frame by counting the frame detection signal by the counter and comparing the content of the counter with the frame number of the desired frame. If the microfilm is moved in the direction a to retrieve the desired frame, the microfilm is stopped when the desired frame is detected by the frame detector. Then, the microfilm is moved in the reversed direction b by a predetermined length l of the film and the film feeding is stopped. By doing so, the desired frame can be correctly positioned in a selected position.

If the feeding speed of the microfilm is variable, there may be used an encoder in place of the above shown timer as measuring means for measuring the amount of film feed. An example of the encoder useful for this purpose is shown in FIG. 6.

Figure 6:
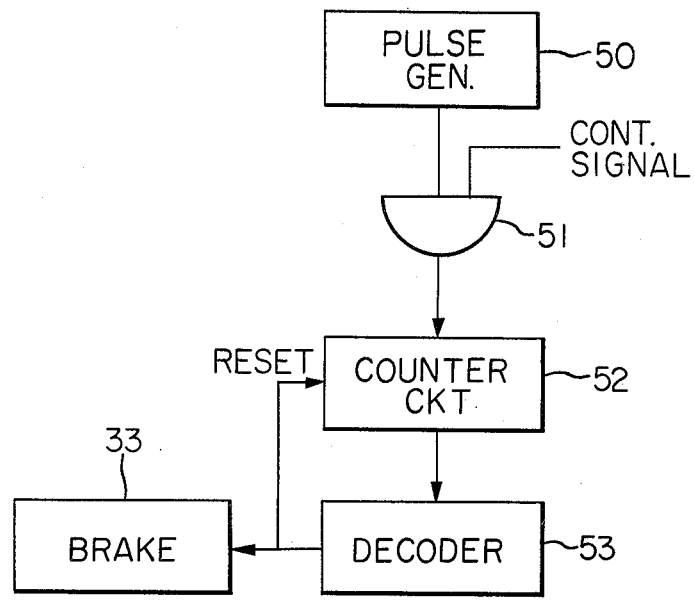
FIG. 6 is a block diagram of another embodiment of means for measuring the amount of film feed.

In FIG. 6, the encoder includes a pulse generator 50 and a counter circuit 52. The pulse generator 50 is so formed as to generate a pulse every time when the microfilm is fed by a determined length. The pulse is applied to AND gate 51 which receives, at its second input terminal, also a control signal from the retrieving apparatus. At the application of the control signal, the pulse is allowed to pass through AND gate 51 and enter the counter circuit 52. The counter 52 counts the pulse up to a preset counter value. When the content of the counter 52 reaches the preset value, a stop signal is generated from a decoder 53 to actuate a brake 33 by which the microfilm is stopped moving. The value set at the decoder 53 is the number of pulses which are generated from the pulse generator 50 during the feed of the microfilm by a predetermined length l. The counter 52 is reset to its start position by the stop signal issued from the decoder 53.

Figure 7:
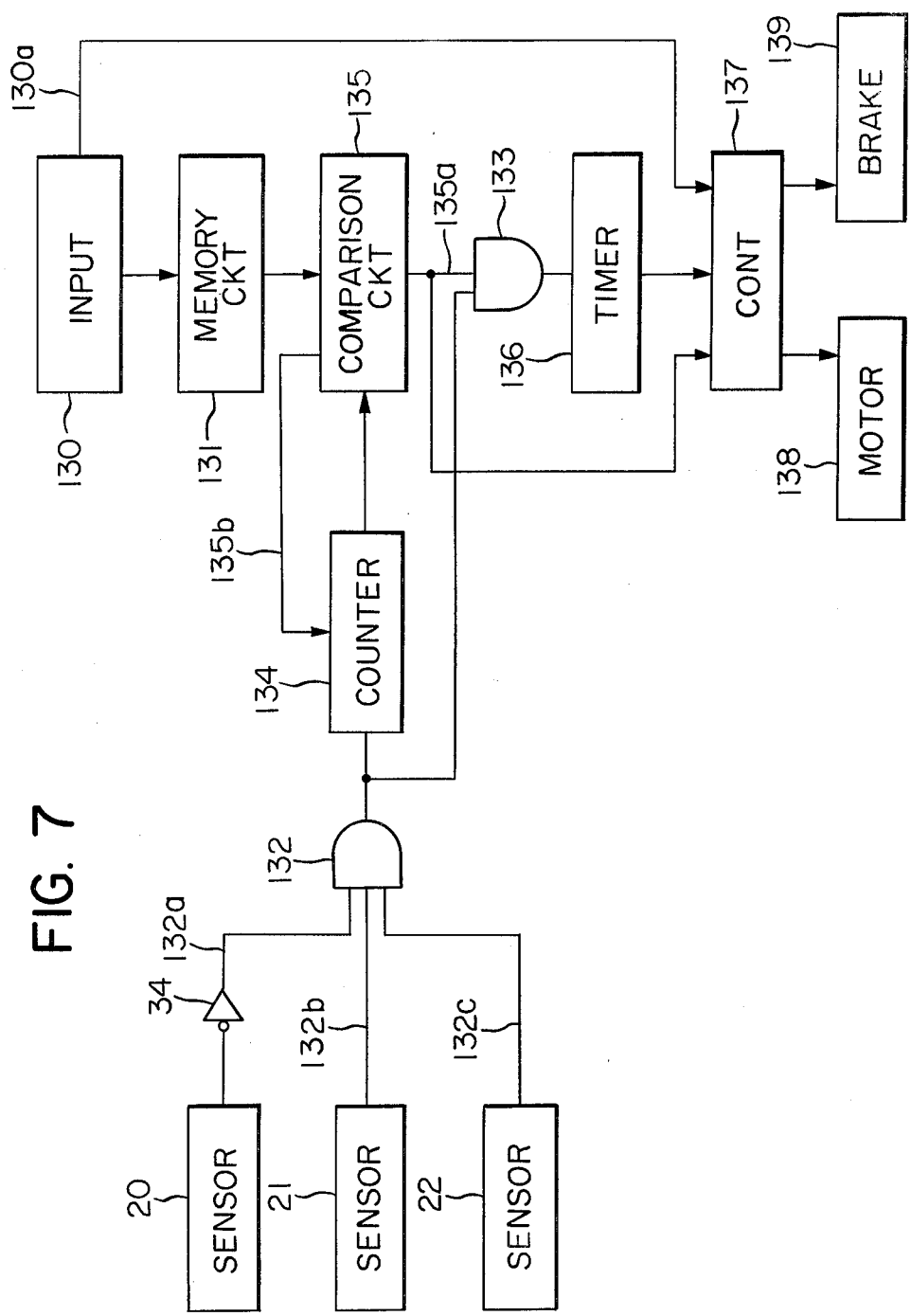
FIG. 7 shows another embodiment of the retrieving apparatus.

FIG. 7 is a block diagram of a retrieving apparatus useful for those microfilms in which an index for retrieving is marked.

In FIG. 7, 130 is an input device for introducing the frame number of an image frame which is desired to be retrieved. The input frame number is stored in a memory 131. References 132 and 133 depict AND gates. A counter 134 is for counting the frame signals produced from AND gate 132. The counter 134 is formed of an up-and-down counter. The mode of the counter can be changed over between count-up mode and count-down mode according to the film feeding direction. In the shown embodiment, the microfilm is being moved in the forward direction. Therefore, the counter is set to count-up mode by an addition signal. If the microfilm is being moved in backward direction, a subtraction signal is applied to set the counter to count-down mode. The addition signal or the subtraction signal is obtained by comparing the content of the memory 131 and the content of the counter 134. When the difference between the two contents is positive, the addition signal is obtained. If the difference is negative, then the subtraction signal is obtained.

A comparator 135 makes a comparison between the frame number registered in the memory 131 and the content of the counter 134. When the latter is coincident with the former, the comparator generates a high level coincidence signal from its output terminal 135a. From another output terminal 135b the comparator issues the addition signal or the subtraction signal according to the sign of the difference between the content of the memory and the content of the counter. Reference 136 is a timer similar to that in the first embodiment. Reference 137 is a drive control circuit, and 138 is a reversible motor for driving the capstan roller 3 into rotation. A brake stops the rotation of the capstan roller 3. When an addition signal is issued from the terminal 135b of the comparison circuit 135, the motor rotates in forward driving direction. When a subtraction signal is issued, it rotates in backward driving direction.

Again, the sensor 20 generates a low level signal when it receives the photo signal from the blank portion 19 of the microfilm (when light falls upon the sensor 20). The sensors 21 and 22 produce out a high level signal when they receives the photo signal from the image frame part (when no light enters the sensors 21 and 22).

After the input of the frame number of the desired frame by the input device 130, the operator gives a command start to retrieve. In response to the start command, a start signal is output from the output line 130a of the input device 130 and also an addition (forward rotation) or subtraction (backward rotation) signal is generated from the comparison circuit 135 to bring the motor 138 into operation and the brake 139 to its inactive position.

As the capstan roller 3 is rotated in a determined direction by the motor 138, the microfilm F is moved, for example, in the direction b in FIG. 5. When the light transmitted through the blank portion 19 enters the sensor 20 and at the same the light toward the sensors 21, 22 is cut off by the image frame, a high level signal is applied to the input terminals 132a, 132b, 132c of the gate 132 at the same time and the gate is opened. From the opened AND gate 132 there is produced a frame signal. The counter 134 counts up or down the frame signal. When the content of the counter 134 becomes coincident with the frame number registered in the memory 131, a coincidence signal is generated by the comparator 135. Since the frame signal is output from AND gate 132 at this time, AND gate 133 is opened to output a signal by which the timer 136 is actuated. The timer 136 has essentially the same structure as the timer 36 in FIG. 4. At a preset timer time after actuated, the timer 136 produce a stop signal to stop the motor 138 through the driving control circuit 137 and also to actuate the brake 139. Thus, the capstan roller 3 stops rotation and the microfilm is stopped. When the microfilm is stopped, the desired frame is just within the copy area P.

If the microfilm is being moved in the direction a for retrieving, the motor 138 is reversed by the coincidence signal from the comparator 135 to move the microfilm in the reversed direction b. When the microfilm is moved in the direction b by a determined film length, a stop signal is issued from the timer 136. Thus, the microfilm is stopped in the position at which the desired frame is correctly in the position determined for it.

Figure 8:
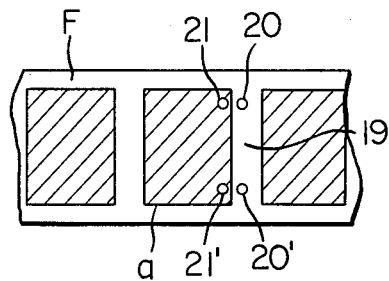
FIG. 8 is a view showing another embodiment of detection means.

FIG. 8 shows another embodiment of the frame detector.

In this embodiment, the density of an image frame a is detected by two sensors 21 and 21' and the density of the blank portion 19 is detected by two sensors 20 and 20'. The center distance between sensors 20 and 21 and between sensors 20' and 21' is determined by taking into consideration the accuracy in stopping the film by the brake. But, it is preferable to make the center distance as small as possible between the sensors 20 and 21 and between the sensors 20' and 21'.

With the above arrangements according to the invention, it is possible to retrieve any desired frame in a long film even when the film has no retrieving marks recorded thereon. Further, the present invention stops the desired frame correctly in any selected position irrespective of the film feeding direction. Since any portion of the image recorded on the desired frame can not be cut off by the frame detector, the whole image of the frame is correctly and completely projected on a projection surface.

While the invention has been particularly shown and described with reference to preferred embodiments thereof, it will be understood by those skilled in the art that modifications changes in form and in details can be made therein without departing from the spirit and scope of the invention.

What we claim is:

1. A process for positioning a film at a copying position to copy a desired information group of the film, the film having a plurality of frames, divided into frame groups, each frame having a portion with information recorded thereon and each frame group having an index at a position corresponding to a first frame of each frame group, the film being along a path which has an index detecting means provided at a position where the index passes and has first and second detecting means provided spaced-apart at positions where the frames pass in a feeding direction of the film, the index detecting means being positioned upstream of the first and second detecting means with respect to a first feeding direction of the film so that the frames in a frame group pass the copying position successively from the first frame to the last frame in the first feeding direction of the film, the first and second detecting means being positioned downstream of the copying position with respect to the first feeding direction so that when said first detecting means detects the information recorded portion of a frame the second detecting means is located at a position to detect a clearance between said frame and an adjacent frame, said process including the steps of:

feeding the film, at the initiation of the copying operation, in the first feeding direction until detection of the last frame of the frame group on which information to be copied is recorded;

stopping the film when the index detecting means detects the index nearest to the last frame of the frame group;

feeding the film in a second feeding direction which is opposite to the first feeding direction until a predetermined length is fed after said first detecting means detects the information recorded portion of the last frame and simultaneously said second detecting means detects the clearance between the frames; and then stopping the film, whereby the copying operation is commenced from the last frame of the frame group.

2. A process according to claim 1, wherein the film is fed in the second feeding direction each time the copying operation of one frame is completed, and the film is stopped when a predetermined length of the film is fed after said first detecting means detects the information recording portion of the next frame and simultaneously the second detection means detects the clearance between adjacent frames, so that the copying operation of the next frame then proceeds.

3. A process according to claim 1, wherein the distance between the middle point of said first and second detecting means and said index detecting means is shorter than the width of the frame in the first and second film feeding directions.

4. A process according to claim 1, wherein said index detecting means is disposed so that when it detects the index, the frame having the index marked thereon is located at the copying position and said first and second detecting means are located at positions slightly spaced from the copying position.

5. A process according to claim 4, characterized in that the copying position and each of said detecting means are located in an illumination light path of a same light source.

* * * * *